(12) United States Patent
Heller et al.

(10) Patent No.: US 7,693,972 B2
(45) Date of Patent: Apr. 6, 2010

(54) DIRECTORY SERVICE IN AN AUTOMATION SYSTEM

(75) Inventors: Rainer Heller, Eckental (DE); Thomas Jachmann, Nürnberg (DE); Norbert Portner, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 1068 days.

(21) Appl. No.: 10/513,345

(22) PCT Filed: Apr. 16, 2003

(86) PCT No.: PCT/DE03/01290

§ 371 (c)(1),
(2), (4) Date: Oct. 28, 2004

(87) PCT Pub. No.: WO03/094046

PCT Pub. Date: Nov. 13, 2003

(65) Prior Publication Data

US 2005/0262227 A1      Nov. 24, 2005

(30) Foreign Application Priority Data

Apr. 29, 2002  (DE)  ............... 102 19 093
Jul. 3, 2002    (DE)  ............... 102 29 877

(51) Int. Cl.
*G06F 15/173* (2006.01)
(52) U.S. Cl. .................................... 709/223
(58) Field of Classification Search ............... 709/223; 370/254
See application file for complete search history.

(56) References Cited

U.S. PATENT DOCUMENTS

| 5,021,997 A | * | 6/1991 | Archie et al. ............... 714/31 |
| 5,339,247 A | | 8/1994 | Kirihara et al. |
| 2002/0046239 A1 | * | 4/2002 | Stawikowski et al. ....... 709/203 |
| 2002/0174178 A1 | * | 11/2002 | Stawikowski ............... 709/203 |
| 2003/0109270 A1 | * | 6/2003 | Shorty ........................ 455/517 |
| 2003/0191802 A1 | * | 10/2003 | Zhao et al. .................. 709/203 |
| 2004/0030627 A1 | * | 2/2004 | Sedukhin ..................... 705/36 |

FOREIGN PATENT DOCUMENTS

WO    WO 00/70585    11/2000

OTHER PUBLICATIONS

Rettberg et al., "Embedded system design based on webservices", Design, Automation and Test in Europe Conference and Exhibition, 2002. Proceedings Mar. 4-8, 2002 pp. 232-236.*
Hashimukai, H., "Web based de-facto standard for manufacturing", SICE 2002. Proceedings of the 41st SICE Annual Conference vol. 2, Aug. 5-7, 2002 pp. 905-908 vol. 2.*
Kreger, H., "Web Services Conceptual Architecture", IBM Software Group, Published May 2001.*

(Continued)

*Primary Examiner*—Rupal D Dharia
*Assistant Examiner*—William J Goodchild

(57) ABSTRACT

The invention relates to a directory service that simplifies the provision of information within an automation system. The directory service serves to provide information regarding access possibilities, functionalities, interfaces and topologies of components of the automation system and is Web service-based.

7 Claims, 1 Drawing Sheet

OTHER PUBLICATIONS

Kreger, H., "Web Services Conceptual Architecture", IBM Software Group, Published May 2001.*

Boonserm Kulvatunyou and Nenad Ivezic, "Semantic Web for Manufacturing Web Services", Proceedings of the Fifth Biannual World Automation Congress, vol. 14, Jun. 9, 2002, pp. 597-606.

Heather Kreger, "Web Services Conceptual Architecture (WSCA 1.0)", IBM Software Group, May 2001, pp. 1-41, Retrieved on Jun. 24, 2002. Internet: <URL:http://www-3.ibm.com/software/solutions/webservices/pdf/WSCA.pdf>.

* cited by examiner

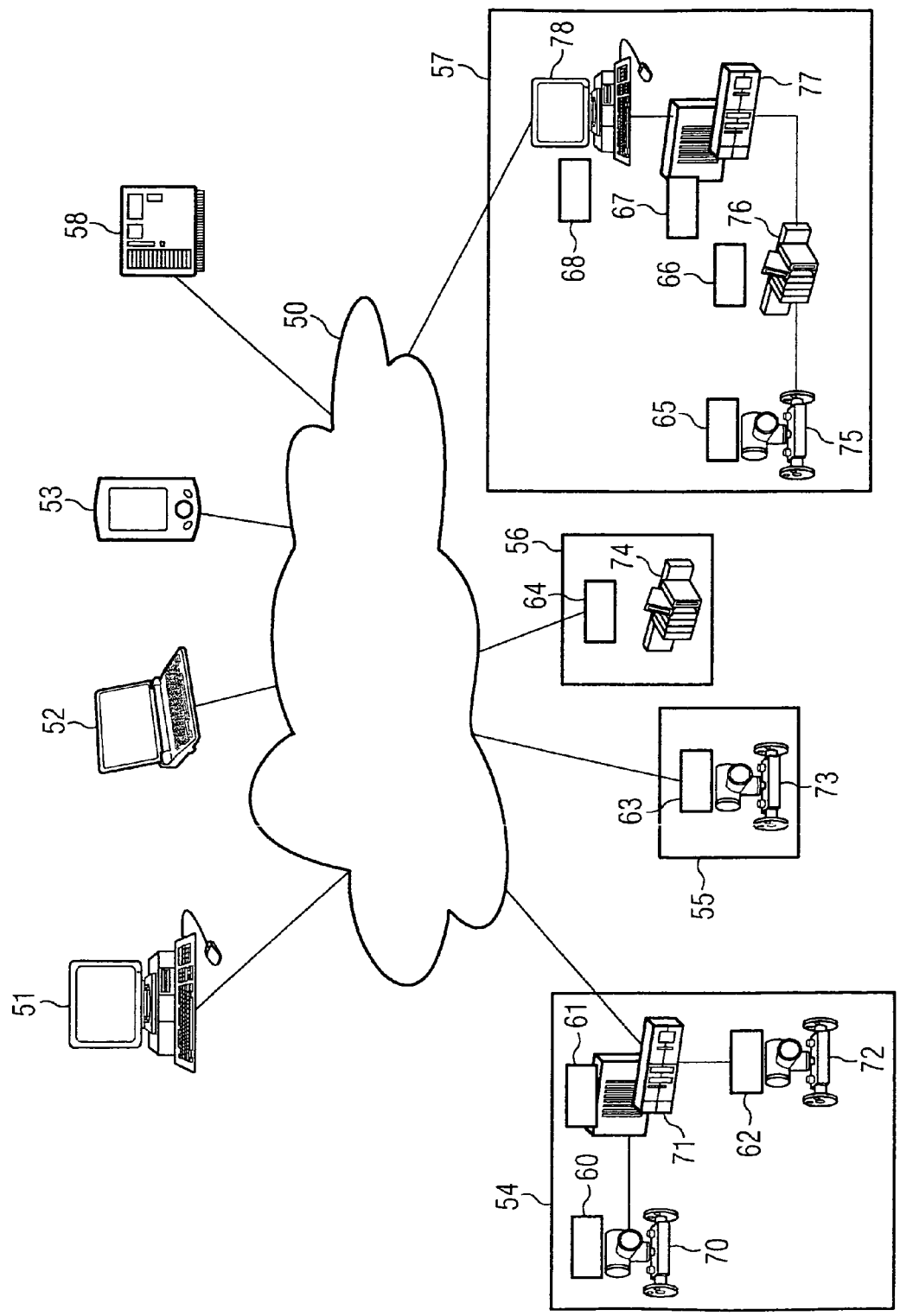

DIRECTORY SERVICE IN AN AUTOMATION SYSTEM

CROSS REFERENCE TO RELATED APPLICATIONS

This application is the US National Stage of International Application No. PCT/DE03/01290, filed Apr. 16, 2003 and claims the benefit thereof. The International Application claims the benefits of German application No. 10219093.3 filed Apr. 29, 2002, and of German application No. 10229877.7 filed Jul. 3, 2002, all three of the applications are incorporated by reference herein in their entirety.

FIELD OF INVENTION

The invention relates to an automation system, in particular an automation system with distributed components, each of which has its own functionality.

BACKGROUND OF INVENTION

Automation systems are usually parameterized manually by a project planner. To do this the project planner must have a thorough knowledge of the individual automation appliances in the automation system with their characteristics and functionalities. Interface descriptions of the automation appliances are frequently only available in paper form or in the form of online support.

SUMMARY OF INVENTION

The object of the invention is to simplify the provision of information within an automation system.

This object is achieved by a directory service in an automation system for the provision of information regarding access possibilities, functionalities, interfaces and topologies of components of the automation system, whereby the directory service is WebService-based.

For the project planner and for the user of an automation system it is of equal interest which components an automation system has, which functionality these components possess and what access possibilities there are to the components. In general, the question is asked as to the availability of a particular service within the automation system. In automation systems so far, there does not exist any entity that can offer such a service. The proposed invention offers a directory service which knows about the components of an automation system and about their functionality.

Today clients are set up in such a way that they have little capacity for generic operation. Usually, they are programmed and projected precisely for the existing appliances. The directory service according to the invention offers the advantage that the usual 1:1 relation (direct linking) between a client and the automation components used by this client is no longer necessary. The directory service is WebService-based. In the Internet there are technologies, standards and de facto standards such as TCP/IP, HTTP, SMTP (Simple Mail Transfer Protocol), XML (Extension Markup Language), SSL (Secure Socket Layer). Increasingly, innovative standards such as SOAP (Simple Object Access Protocol), WSDL (Web Service Description Language), UDDI (Universal Discovery Description and Integration) are emerging and spreading in the WebService environment. These Internet technologies can be adapted for automation technology. As they are open standards, they can be used (possibly extended by automatic system descriptive features) to describe automation systems.

In this way it is possible to describe both the (software) interfaces of individual automation appliances and also their structural topology within an automation installation or an automation system. This information can be used directly by programs as well as by applications. Hereby, applications can be realized in a more generic manner than is possible today. In this way the invention makes it possible to use standard Internet technologies, in particular from the WebService environment, applied to automation structures, such as, for example, automation systems or installations, automation cells, automation components and/or automation appliances.

Such a directory service can, in accordance with an advantageous form of the invention, be designed as the central directory service on a server, e.g. in the form of a central XML-based information service modeled on UDDI (Universal Discovery Description and Integration) in the WebService environment, here adapted to the interests of the automation technology.

In order to browse in installation structures, to search for certain (kinds of) appliances and, in particular, also to find services provided by appliances, it is proposed that a Query Service be provided within the directory service of the automation system to search for components and/or functionalities.

According to a further advantageous embodiment of the invention, the directory service has means for the automatic registration of components and/or functionalities of the automation system. Automation appliances or components can thus be automatically-registered at the central directory service. Hereby, in particular, an automatic registration of Web-Services provided by the automation appliance can be entered into the directory service.

The directory service is not necessarily realized as a central entity, but in order to increase the redundancy, can, for example, be designed as a distributed service (e.g. as a cluster, Webfarm, local database, etc.).

BRIEF DESCRIPTION OF THE DRAWING

The single FIGURE shows in a schematic diagram an embodiment of the invention.

DETAILED DESCRIPTION OF INVENTION

The invention is described and explained in detail below using the embodiment illustrated in the FIGURE. The FIGURE shows a schematic diagram of the principle of the use of a directory service in a distributed automation system. The distributed system contains various operational and observational systems 51 to 53, distributed automation installations 54 to 57 and a central directory service 58. The communication between operational and observational systems 51 to 53 and automation installations 54 to 57 is via an Internet and/or Intranet 50. The distribution of the different automation installations 54 to 57 can be arranged so they are as far apart from each other as desired. The access to the components 70 to 78 of the automation installations 54 to 57 is via WebServices 60 to 68. In the embodiment, the operational and observational systems 51, 52 and 53 are designed as part of a control station, or as a mobile Personal Digital Assistant (PDA) of a service technician. However, the communication via the Internet and/or Intranet 50 does not only occur between the operational and observational systems 51 to 53 and the automation installations 54 to 57 but also between the individual automation installations 54 to 57 or between the components 70 to 78 of the automation installations.

The principle of the use of the directory service 58 in a distributed automation system is to be explained using the FIGURE. The components 70 to 78 of the automation system each have at least one interface for the message and port based access to at least one application provided by the respective components 70 to 78. In the embodiment, these applications are realized as WebServices 60 to 68. Such a WebService 60 to 68 makes a certain functionality available, uses Internet processes and does not have a status. The interfaces of the components of the automation system are described using meta information. An interface can, for example, be designed as an XML interface. In the embodiment, an "Automation Directory Discovery and Integration" (ADDI) is defined as a central directory service 58. The above named directory service UDDI does not meet the requirements of the automation technology, as it is optimized for E-Business services. Therefore, for the ADDI definition, automation specifics are given special consideration. UDDI schemata and functionalities are extended for the ADDI directory service 58 and thus allow the use of the UDDI mechanisms/clients in the automation environment as well. In the directory service 58 ADDI, installation structures can be mapped by analogy to the White and Yellow Pages of UDDI. At the lowest level, corresponding to the Green Pages of UDDI, are filed the service descriptions of the automation appliances, components 70 to 78 and applications 60 to 68.

Below, further advantages of the invention and its embodiments are presented. Because installation data is made available using a uniform mechanism, it is possible to create generic applications. These can use the directory service 58 (ADDI), for example, to browse an installation structure in order to find components and interfaces and/or in order to perform services. Thus generic applications (which are not possible today), can be created, in particular for standardized functionalities such as diagnostics, downloading, parameterizing etc. Based on the installation structure filed in the directory service 58, this service can serve as a central inquiry entity for existing appliances in an installation or in an automation system. This allows the most varied inquiry information, from browsing the existing installation to queries about the version statuses of Firmware on individual appliances. The applications (services) offered by automation appliances are uniformly described (e. g. with WSDL Files in WebServices). To describe the appliances, a type/entity concept is realized at WSDL level. This reduces redundant storage of identical data. Services can be implemented with optimized storage in automation appliances, as meta information regarding (automation) appliances, applications and/or WebServices are filed and administered centrally. The proposed directory service 58 serves, moreover, as a basis for establishing consolidation services. Because of the data available in the directory service 58, additional services are possible. Thus data is available or can be stored for summation, maintenance analysis, efficiency analysis on the automation system, on levels or cells. With the Query Service helping to search for components and/or functionalities of the automation system, questions can be answered such as, for example: "What services does the automation appliance 4711 in hall 3 offer?" or "Search for all appliances offering the standard diagnostic service!"

The proposed means for automatic registration of components and/or functionalities of the automation system can be designed as described below. In a first embodiment, the automation appliance or the automation components as part of a Discovery Process (UPNP—Universal Plug and Play), makes information regarding all the WebServices 60 to 68 on offer available to the directory service 58. In a second embodiment, via a standardized service, the directory service 58 scans the WebServices 60 to 68 provided by the automation system after the Discovery Phase of the respective automation appliances 70 to 78. This can, for example, occur via standardized WebService interfaces of the automation appliances 70 to 78. The Discovery Phase can here also consist of entering the addressing of the respective appliance manually/partly automatically in the directory service 58, and the directory service 58 then automatically interrogates the appliance about its services. Therefore, it is not only the existence of the automation appliances 70 to 78 that is registered, but above all their functionality. The registration can also be done conventionally, the data from a design or an engineering system being transferred directly into the directory service 58.

To further explain the invention, an overview of the WebService technology is given below. This technology permits both the direct communication between applications (the so-called services) and also the creation of applications from distributed components (again services), i.e. loosely connected WebServices can work together to fulfill a task. Using standards such as XML and SOAP, the WebService technology scales from local communication up to communication via the Intranet/Internet. It is the basis for distributed and integrated Internet applications, and uses existing standards (e.g. W3C standards, IETF standards such as HTTP, XML, XML Schema, XML Data Types, etc.) or together with W3C, IETF new defined standards such as SOAP, WSDL, UDDI. Interfaces of WebServices are described using meta information (methods, parameters (names and types), usually in WSDL (Web Service Description Language). This complete interface description is sufficient to call up the WebServices. It describes the end point (port), under which the respective WebService can be called up and is useful, in particular, for automatic communication with WebServices. WebServices are distinguished by an ease of access, whereby the boundaries between local APIs and WebServices ("Web-APIs") blur. The access is just as easy as when generating and using a local object. The WebService technology is thus the basis for loosely linked applications. It is characterized by message-based communication and scalability by having no status. The loose linking (e.g. with SOAP) offers, in particular, the advantages of good tolerance towards changes in the implementation at the client and server and of robust communication (port-based, message-based, asynchronous). In message-based systems, a client packs messages in self-descriptive packets (messages) and sends them like that via the respective communication link. An agreement between sender and recipient exists only with respect to the message format on the line. The only assumption is that the recipient understands the message. No assumptions are made as to what happens after receipt of the message or between sender and recipient. Conventional WebServices have the following characteristics: they are accessible via a communication network such as the Internet/Intranet and they have one XML interface. Information about the WebServices is stored in a registry, so that, via these, the WebServices can be located. They communicate with the help of XML messages via Web protocols and support loosely linked connections between systems.

In summary, the invention thus relates to a directory service 58 that simplifies the provision of information within an automation system. The directory service 58 serves to provide information regarding access possibilities, functionalities, interfaces and topologies of components of the automation system and is WebService-based.

The invention claimed is:

1. A method for making available a directory service in an automation system, comprising:

providing a plurality of Webservice applications in the automation system, each implementing at least one Internet standard selected from the set TCP/IP, HTTP, SMTP, XML, and SSL;

providing a plurality of appliances in the automation system, each appliance comprising an automation apparatus with a data interface to at least one of the Webservice applications, the appliances forming a distributed structural topology of the automation system;

providing an Automation Directory Discovery and Integration directory service (ADDI) on a server with access to at least some of the Webservice applications via a data communications network, the ADDI comprising a mapping of installation structures and the structural topology of the automaton system, and a database of access possibilities, service and functionality descriptions, and interface information of the appliances;

providing a query service on the server for accessing the ADDI by remote operational and observational systems and by installations of the automation appliances via the data communications network; and automatically registering the appliances and functionalities of the automation system by providing a plug-and-play discovery process in which a newly installed one of the appliances automatically notifies the ADDI via the data communications network of the existence and address of the newly installed appliance, said notification being followed by an interrogation process in which the ADDI interrogates the newly installed appliance about its services and functionalities;

wherein the ADDI discovers and integrates the appliances for remote operation, parameterization, control, diagnostics, and servicing thereof by a generic program in each of the remote operational and observational systems without custom generation of the generic program.

2. The method of claim 1 wherein the ADDI further comprises a Universal Discovery Description and Integration schema and functionalities (UDDI) that are extended by mapping the installation structures of the automaton system to the UDDI, and by filing the service descriptions of the appliances in the UDDI.

3. The method of claim 1 wherein the method further comprises using the ADDI to browse the installation structure in order to find a given appliance.

4. An automation system of appliances with a directory for providing information regarding access possibilities, functionalities, and interfaces of the appliances, and regarding topologies of the automation system, comprising:

a plurality of Webservice applications in the automation system;

a plurality of appliances in the automation system;

each appliance comprising an automation apparatus with a data interface to at least one of the Webservice applications, the appliances forming a structural topology of the automation system;

an Automation Directory Discovery and Integration directory service (ADDI) on a server with Internet access to at least some of the Webservice applications;

the ADDI comprising a Universal Discovery Description and Integration schema and functionalities (UDDI) that are extended by mapping installation structures of the automaton system to white and yellow pages of the UDDI, and by filing service descriptions of the appliances in green pages of the UDDI, and by mapping the structural topology of the automation system;

wherein the ADDI discovers and integrates the appliances for operation, parameterization, control, diagnostics, and servicing thereof;

wherein the ADDI provides a query service for accessing the ADDI by generic programs without custom generation of the generic programs in remote operational and observational systems and by remote installations of the automation appliances via the Internet; and further comprising a mechanism for automatically registering components and functionalities of the automation system, the mechanism comprising a plug-and-play discovery process in which a newly installed one of the appliances automatically notifies the ADDI via the Internet of the existence and address of the installed appliance, said notification followed by an interrogation process in which the ADDI interrogates the newly installed appliance about its services and functionalities.

5. The automation system of claim 4, wherein the ADDI is designed as a central directory service on a server.

6. The automation system of claim 4, wherein the ADDI is designed as a distributed service.

7. The automation system of claim 4 wherein the Webservice applications implement at least one Internet standard selected from the set TCP/IP, HTTP, SMTP, XML, and SSL.

* * * * *